United States Patent Office 3,152,177
Patented Oct. 6, 1964

3,152,177
BROMINATION OF SALICYLANILIDE
Theodore E. Majewski, Midland, Mich., assignor to The Dow Chemical Company, Midland, Mich., a corporation of Delaware
No Drawing. Filed Mar. 5, 1962, Ser. No. 177,257
3 Claims. (Cl. 260—559)

This invention relates to a novel process for the bromination of salicylanilide. More particularly, this invention involves the bromination of salicylanilide in a p-dioxane medium to produce a mixture rich in 4',5-dibromosalicylanilide.

A number of methods have been proposed for the bromination of salicylanilide. Some common reaction media used in such methods are alcohol, water, and mixtures thereof. The use of such reaction media usually results in a product mixture low in 4',5-dibromosalicylanilide. In most of the methods in use prior to the present invention the sought result was 3,4',5-tribromosalicylanilide, either in pure form or as a substantial proportion of the product mixture.

It is generally thought that it is considerably less difficult to brominate dibromosalicylanilide to tribromosalicylanilide than to brominate salicylanilide to dibromosalicylanilide. For this and other reasons, it was unexpected that a p-dioxane containing reaction medium would substantially hold the bromination reaction at dibromosalicylanilide. It was further unexpected that the predominant product would be the 4',5-dibromosalicylanilide isomer.

The method of this invention may be accomplished by mixing salicylanilide with p-dioxane or with a mixture of p-dioxane and water. To the slurry thus formed is added bromine in the desired amount. The reaction mixture is then heated to the desired temperature, such temperature being maintained until the reaction is substantially complete. Optionally, the reaction may be carried out in two or more steps, as by allowing the reaction mixture to stand at room temperature for a period of time, then raising the temperature for a further period of time. When reaction is substantially complete, the mixture is cooled, and the product mixture of brominated salicylanilide is removed from the p-dioxane containing reaction medium as by filtering. The product may then be washed and dried if desired.

Typical reaction medium compositions appropriate for use in the process of the present invention may range from about 85 percent p-dioxane–15 percent water to pure p-dioxane. More than 15 percent water in the reaction medium generally results in a product mixture undesirably low in 4',5-dibromosalicylanilide.

Reaction temperatures at which the process of this invention is operable may range from about 35 to about 85 degrees centigrade. Appropriate reaction time may be from about one hour to about four hours.

For best results, reactants are preferably added in a ratio of about two moles of bromine per mole of salicylanilide. Ratios of from about one mole of bromine per mole of salicylanilide to about three moles of bromine per mole of salicylanilide are operable.

Enough reaction medium is generally used to form a suspension or slurry with the starting salicylanilide. Generally from about one to about five volumes of reaction medium per unit volume of total reactant material is used. Washing of the reaction product, if desired, may be accomplished by use of portions of the pure reaction medium. Drying may be carried out at slightly elevated temperatures.

The product of this process of the present invention usually contains 4',5-dibromosalicylanilide as the predominant constituent. Unreacted salicylanilide is usually removed in the washing step, but trace amounts may be present in the final product mixture.

Mixtures produced by the process of this invention are useful because of their combined bacteriostatic properties and low oral toxicity when compared with mixtures containing predominant amounts of 3,4',5-tribromosalicylanilide. If desired, the mixtures of this invention may also be used as sources of pure 4',5-dibromosalicylanilide.

The process of the present invention may be more easily understood in light of the following examples which are set forth to illustrate, and are not to be construed to limit this invention.

*Example 1*

A slurry was prepared by adding 0.35 mole of salicylanilide to a mixture of 150 milliliters p-dioxane and 15.5 milliliters water. At a slurry temperature of from about 40 to about 50 degrees centigrade, 0.72 mole of bromine was added thereto. After addition of the bromine to the slurry, the temperature of the thus formed reaction mixture was maintained at from about 50 to about 60 degrees centigrade for one hour. At the end of this time, the temperature of the reaction mixture was raised to about 80 degrees centigrade and maintained thus for two more hours. At this time, the mixture was cooled to 25 degrees centigrade and was filtered. The solids left after filtration were then washed three times with 50 milliliter portions of 50 percent p-dioxane–50 percent water. After washing, the solid product was dried at 65 degrees centigrade. A yield of 82.6 percent was obtained, the product having the following analysis:

|  | Percent |
|---|---|
| 4',5-dibromosalicylanilide | 52.5 |
| 5-bromosalicylanilide | 12.0 |
| 3,5-dibromosalicylanilide, 3,4',5-tribromosalicylanilide | 35.2 |
| Salicylanilide | 0.3 |

*Example 2*

A slurry was prepared by adding 0.4 mole of salicylanilide to 150 milliliters of p-dioxane. At a slurry temperature of from about 40 to about 50 degrees centigrade, 0.82 mole of bromine was added thereto. After addition of the bromine to the solution, the temperature of the thus formed reaction mixture was maintained at from about 55 to about 60 degrees centigrade for one hour. The temperature of the reaction mixture was then raised to about 80 degrees centigrade and maintained thus for about two hours. At this time, the mixture was cooled to 25 degrees centigrade and was filtered. The solids left after filtration were washed three times with 50 milliliter portions of 90 percent p-dioxane–10 percent water, and then washed four times with 100 milliliter portions of water. After washing, the solid product was dried at 65 degrees centigrade. A yield of 64.3 percent was obtained, the product having the following analysis:

|  | Percent |
|---|---|
| 4',5-dibromosalicylanilide | 71.7 |
| 5-bromosalicylanilide | 12.6 |
| 3,5-dibromosalicylanilide, 3,4',5-tribromosalicylanilide | 15.4 |
| Salicylanilide | 0.3 |

Various modifications may be made in the present invention without departing from the spirit or scope thereof, and it is to be understood that I limit myself only as defined in the appended claims.

I claim:
1. In a method of producing a mixture of bromination products of salicylanilide containing predominantly 4',5-dibromosalicylanilide wherein salicylanilide is contacted with bromine in a reaction medium whereby bromination is accomplished, the improvement which comprises providing as the reaction medium a mixture of (A) p-dioxane and (B) a maximum of 15 percent of water.

2. In a method of producing a mixture of bromination products of salicylanilide containing predominantly 4',5-dibromosalicylanilide wherein salicylanilide is contacted with bromine in a reacton medium whereby bromination is accomplished, the improvement which comprises providing as the reaction medium a mixture of about 90 percent p-dioxane and about 10 percent water.

3. In a method of producing a mixture of bromination products of salicylanilide containing predominantly 4',5-dibromosalicylanilide wherein salicylanilide is contacted with bromine in a reaction medium whereby bromination is accomplished, the improvement which comprises providing p-dioxane as a reaction medium.

References Cited in the file of this patent

UNITED STATES PATENTS

| 2,802,029 | Schuler | Aug. 6, 1957 |
| 2,967,885 | Lamberti | Jan. 10, 1961 |
| 2,997,502 | Mattson | Aug. 22, 1961 |

FOREIGN PATENTS

| 840,366 | Great Britain | July 6, 1960 |

OTHER REFERENCES

MacArdle: The Use of Solvents, page 3 (1925), QD 281. S8 M3.